(12) United States Patent
Williams (10) Patent No.: US 7,746,467 B2
(45) Date of Patent: Jun. 29, 2010

(54) FRICTIONAL PIVOTS FOR GRAVITATIONAL ALIGNMENT

(75) Inventor: Nigel Emlyn Williams, London (GB)

(73) Assignee: Black & Decker Inc., Newark, DE (US)

( * ) Notice: Subject to any disclaimer, the term of this patent is extended or adjusted under 35 U.S.C. 154(b) by 857 days.

(21) Appl. No.: 10/590,669

(22) PCT Filed: Feb. 18, 2005

(86) PCT No.: PCT/EP2005/050726

§ 371 (c)(1),
(2), (4) Date: Aug. 25, 2006

(87) PCT Pub. No.: WO2005/083354

PCT Pub. Date: Sep. 9, 2005

(65) Prior Publication Data

US 2008/0231848 A1    Sep. 25, 2008

(51) Int. Cl.
*G02B 27/32* (2006.01)
(52) U.S. Cl. .................................. 356/256; 356/614
(58) Field of Classification Search ................ 356/256, 356/614–615, 620–622, 250; 250/231.13–231.18, 250/237 R; 345/161–169, 157–158, 173–175
See application file for complete search history.

(56) References Cited

U.S. PATENT DOCUMENTS 2,408,589 A * 10/1946 Wells ....................... 250/578.1

5,912,733 A  6/1999 Dunlop et al.

FOREIGN PATENT DOCUMENTS

| DE | 3932044 | 4/1991 |
|---|---|---|
| EP | 1012539 | 6/2000 |
| EP | 1422497 | 5/2004 |
| GB | 769495 | 3/1957 |
| GB | 2388899 | 11/2003 |
| JP | 2002107143 | 4/2002 |
| WO | WO9811407 | 3/1998 |

OTHER PUBLICATIONS

Translation of Narisawa Junichi (JP. Publication No. 2002-107143).*

* cited by examiner

*Primary Examiner*—Gregory J Toatley, Jr.
*Assistant Examiner*—Tri T Ton
(74) *Attorney, Agent, or Firm*—Adan Ayala (57) ABSTRACT

A frictional pivot 100 for use in a device measuring gravitational alignment is provided. The frictional pivot 100 comprises a gravity-responsive directional means 200 for indicating a datum direction of alignment with gravity; frictional pivoting means 300, 400 for allowing the gravity-responsive means coarsely to align with gravity; vibration means 303, 403 for vibrating one or more elements of the pivoting means; and portable power means 303*a* for powering the vibration means 303, 403.

8 Claims, 7 Drawing Sheets

FRICTIONAL PIVOTS FOR GRAVITATIONAL ALIGNMENT

BACKGROUND OF THE INVENTION

This invention relates to devices containing frictional pivots in general, and more particularly but not necessarily to devices such as laser levels, which rely on frictional pivots for gravitational alignment of pendulous components about an axis.

The accuracy of such a device depends upon the accuracy with which the pendulous components align with gravity. Any misalignment leads to inaccuracy in the device. Friction in the point or points about which the pendulous components pivot is the chief cause of this misalignment. Conventionally, this problem is addressed by reducing friction in the pivot by employing such means as lubrication or precision roller bearings.

Unfortunately, this conventional solution generates further problems, one of which is that as friction is reduced in the pivot, so the pendulous components take longer to stop oscillating and come to rest. As accurate readings cannot be taken until the pendulous components come to rest, the lower the friction of the bearing, the longer the user must wait before taking a reading and therefore the more inconvenient it is to use the device. The conventional solution to this problem is to apply damping means to reduce the oscillations.

A further problem with very low-friction pivots is that the pendulous components are easily disturbed by stray environmental influences, setting up further oscillations of the pendulous components, incurring further delays in readings and inconvenience to the user.

Thus it can be seen that the conventional solution to the problem of inaccuracy caused by misalignment leads to expensive and complicated solutions which generate further problems necessitating more expense and complication in their solution.

SUMMARY OF THE INVENTION

The principal object of this invention is to address all of these problems simply and economically without generating further problems.

To see how this may be done, first consider the forces at work in a simple rigid pendulum, having a weight at one end and a pivot at the other. When released from a position in which the weight is not gravitationally aligned, the gravitational restoring force causes a downward swing of the pendulum. The pendulum passes through the point of gravitational alignment and continues on an upward swing, slowing down as friction in the pivot and gravity act upon the pendulum, reducing its velocity until the angular momentum is zero and the pendulum stops, very briefly, at the top of its swing. If the gravitational restoring force is greater than the static friction in the pivot, then the pendulum will repeat this cycle. If not, then the pendulum will remain motionless. The reason for this lies in the fact that, when the pendulum is moving, its movement is resisted by the dynamic or rolling friction in the pivot. At the end of the pendulum's swing, before it reverses direction, it comes to a halt, and, at that point the resistance to any further movement is due not to dynamic friction, but to static friction. Static friction is considerably higher than dynamic friction at this point. The pendulum will always stop at the end of a cycle and that point will always be beyond the point of gravitational alignment. The distance between these two points will be proportional to the friction in the pivot and will represent the ultimate accuracy of the device relying upon this alignment. With a high-friction pivot this accuracy will be poor. With a low-friction pivot, the accuracy of alignment will be better, but the lower friction in the bearing will mean an increased number of oscillations of the pendulum leading to a delay in the pendulum coming to rest.

The present invention addresses these problems simply and inexpensively by employing a pivot which is designed to be deliberately and controllably frictional.

According to the present invention, a frictional pivot comprises gravity-responsive directional means for indicating a datum direction of alignment with gravity, frictional pivoting means for allowing the gravity-responsive means coarsely to align with gravity, vibration means for vibrating one or more elements of the pivoting means, and portable power means for powering the vibrating means.

The length and frequency of occurrence of vibration produced by the vibrating means might be controlled by manual switches or electronic timing circuitry.

Pendulous movement is resisted by the frictional force in the pivot, thus preventing free oscillations of the pendulous components, but the pivot is not so frictional as to inhibit the pendulous components from coarsely aligning with gravity.

Vibration is applied to one or more members of the pivot. This vibration causes one element of the pivot to move fractionally relative to the other. This converts the static friction into dynamic friction. Thus, for the duration of the pulse of vibration, further movement is enabled and the pendulous components, under the influence of the gravitational restoring force, move closer to gravitational alignment. So that the momentum of the pendulous components does not cause them to move past the point of gravitational alignment, the pulses of vibration should be shorter than a quarter of the period of the pendulum. The vibration of the pendulum therefore ceases around the position of gravitational alignment and the comparatively high static friction in the un-vibrated pivot will reduce the extent of the motion beyond the position of gravitational alignment, thus ensuring that the pivot comes to rest close to a position of gravitational alignment. In addition, the comparatively high static friction of the pivot renders the pivot relatively immune from environmental disturbances which would adversely affect instruments employing a low-friction bearing.

Experiments have shown that a 10 gm mass at 40 mm radius from the axis of rotation may be displaced by plus or minus 1.623 degrees from gravitational alignment in an un-vibrated pivot. Using the same pivot, after three seconds of vibration this displacement is reduced to plus or minus 0.00955 degrees from gravitational alignment. With pulsed vibration as described above the settling time may be further reduced.

It will thus be appreciated that the present invention can enhance the accuracy and convenience of such instruments utilising gravitational alignment while at the same time reducing the expense of such instruments by allowing the replacement of expensive precision roller bearings by inexpensive pivots.

A first embodiment of the invention has a reference point at one end of a weighted pendulous arm orthogonally attached to a pivotable shaft. Conical shaft ends are located in conical depressions in two opposing plates of a flexible material which are held apart at a predetermined distance by being rigidly attached to a case. A region of the plates projects beyond the case and is unsupported. In this region is located the conical depression and the vibration means. A small, low-voltage electric motor provides an inexpensive vibration means with an axially attached eccentric weight. Motors of this type are used in mobile phones and pagers.

A second embodiment of the invention includes an eccentrically weighted cylindrical housing frictionally attached about a common axis to another cylindrical housing, the second housing containing a laser projecting means. In this embodiment, a reference point indicating gravitational alignment is a mark on the circumference of the weighted housing, with other marks spaced at regular angular intervals on the circumference of the second housing indicating the angular displacement of the laser projecting means away from the gravitational vertical.

Another embodiment of the invention might place the vibrating means within one or both of the cylindrical housings.

In a further embodiment one or both of the two opposing plates are replaced by slugs of material with conical depressions. These slugs are axially movable relative to the pivotable shaft and are held against the ends of the shaft by leaf or helical springs to provide the frictional pre-loading of the pivot.

Although the following description sets out a number of distinct examples of the present invention it will be evident to one skilled in the art that the various features could be combined to form further similar examples.

BRIEF DESCRIPTION OF THE DRAWINGS

Frictional pivots, in accordance with the present invention, will now be described in more detail, by way of example only, with reference to the accompanying drawings, in which.

DETAILED DESCRIPTION OF THE INVENTION

In all of the drawings, switching/timing means and portable power means have been omitted for clarity.

FIGS. 1 to 4 show a frictional pivot 100 comprising a pendulous assembly 200 connected via axial shaft 500 to pivot halves 300 and 400 which are rigidly attached to case 600.

The pendulous assembly 200 includes a pendulum 201, weight 202 and reference point 203. Pivot half 300 is a plate 301 with a conical depression 302 and vibrating means 303. Plate 301 is rigidly attached to case 600 in such a way that an elongate portion comprising the conical depression 302 and the vibrating means 303 is able to move axially with reference to shaft 500. This movement is governed by the gauge and springiness of plate 301. Similarly pivot half 400 comprises plate 401 with a conical depression 402 and vibrating means 403. Axial shaft 500 has conical ends 501 and 502 which locate in conical depressions 302 and 402. The relative angles of shaft end and depression may be such that only the points of the shaft bear on the conical depressions. The force with which axial shaft 500 is held between conical depressions 302 and 402 may be varied according to the flexibility of plates 301 and 401. Plates 301 and 401 may be angled inwards to increase this force, thereby increasing the friction between plates 301 and 401 and shaft 500.

Vibrating means 303 and 403 may be of an electromechanical, magnetostrictive or piezoelectric nature. The switching/timing controls (not shown) are existing and well known and the common 555 timer type of integrated circuit such as NE555N manufactured by Fairchild Semiconductor Corporation, or the NE555P manufactured by Texas Instruments, or equivalent may provide pulses from seconds to milliseconds. Thus it will be seen that two such integrated circuits may be employed, one to control the duration and the other to control the frequency of occurrence of the vibration pulses.

The pendulous assembly 200, pivot halves 300 and 400 and case 600, together, form a tuned mechanical assembly, the design and selection of the components being inter-dependent. The mass of pendulous assembly 200 may be varied, depending on the application in which the present invention is employed. The rigidity of plates 301 and 401 and the strength of vibration applied by the vibration means 303 and 403 must be chosen to accommodate the mass of the pendulous assembly.

Figure 1:
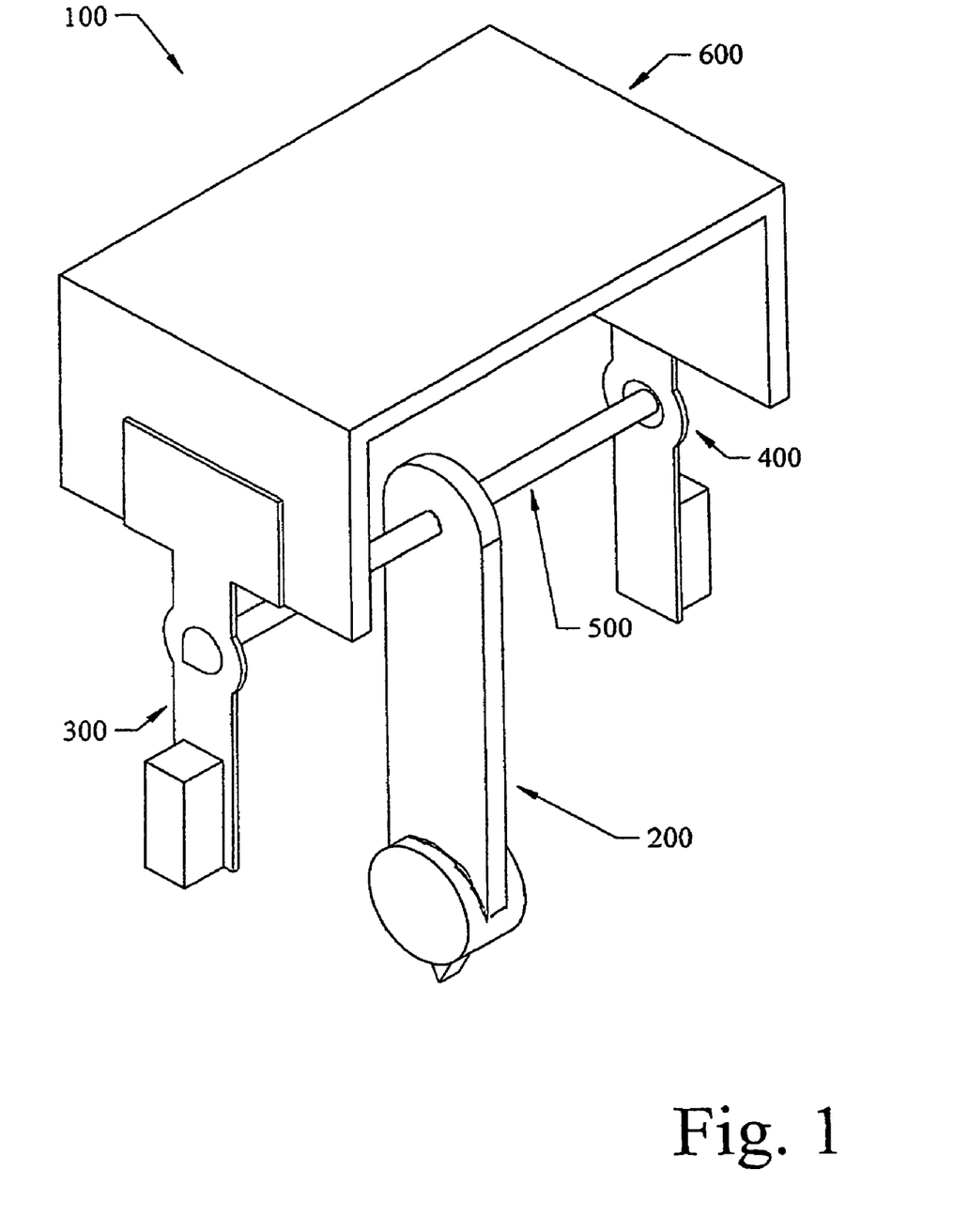
FIG. 1 is a perspective view of a first embodiment of a frictional pivot according to the present invention.
Figure 2:
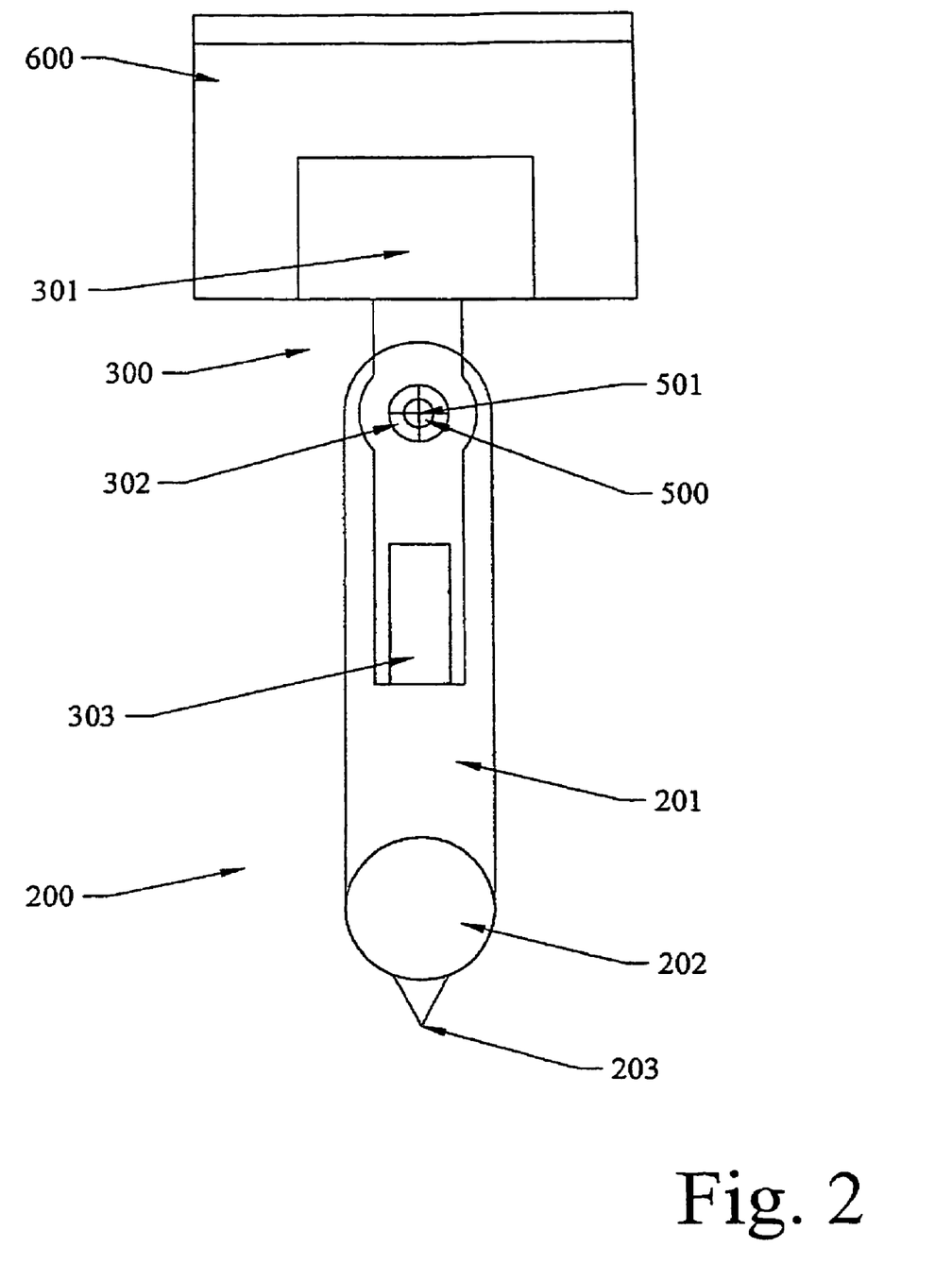
FIGS. 2, 3 and 4 are side, front and plan views of FIG. 1, respectively.
Figure 3:
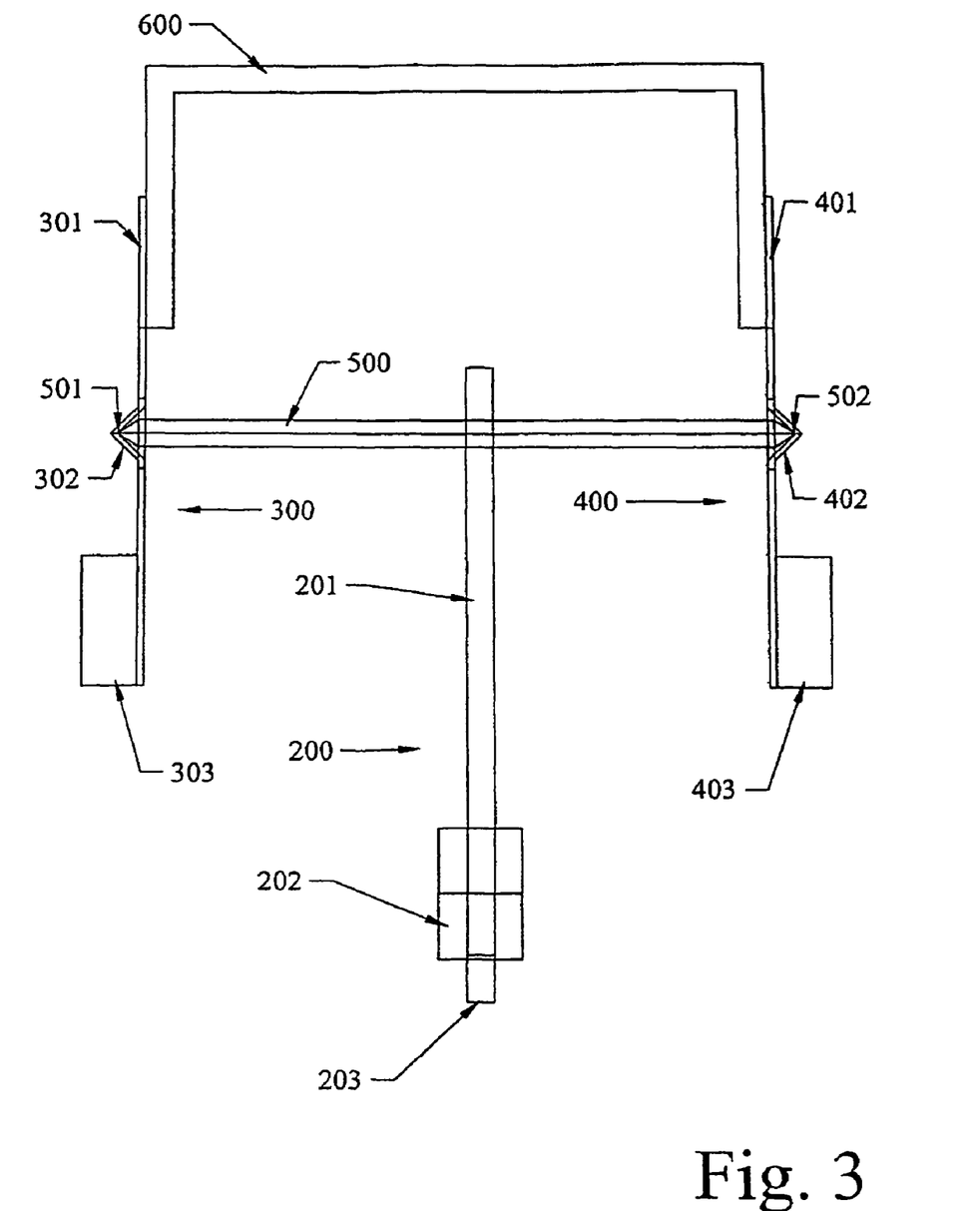
Figure 4:
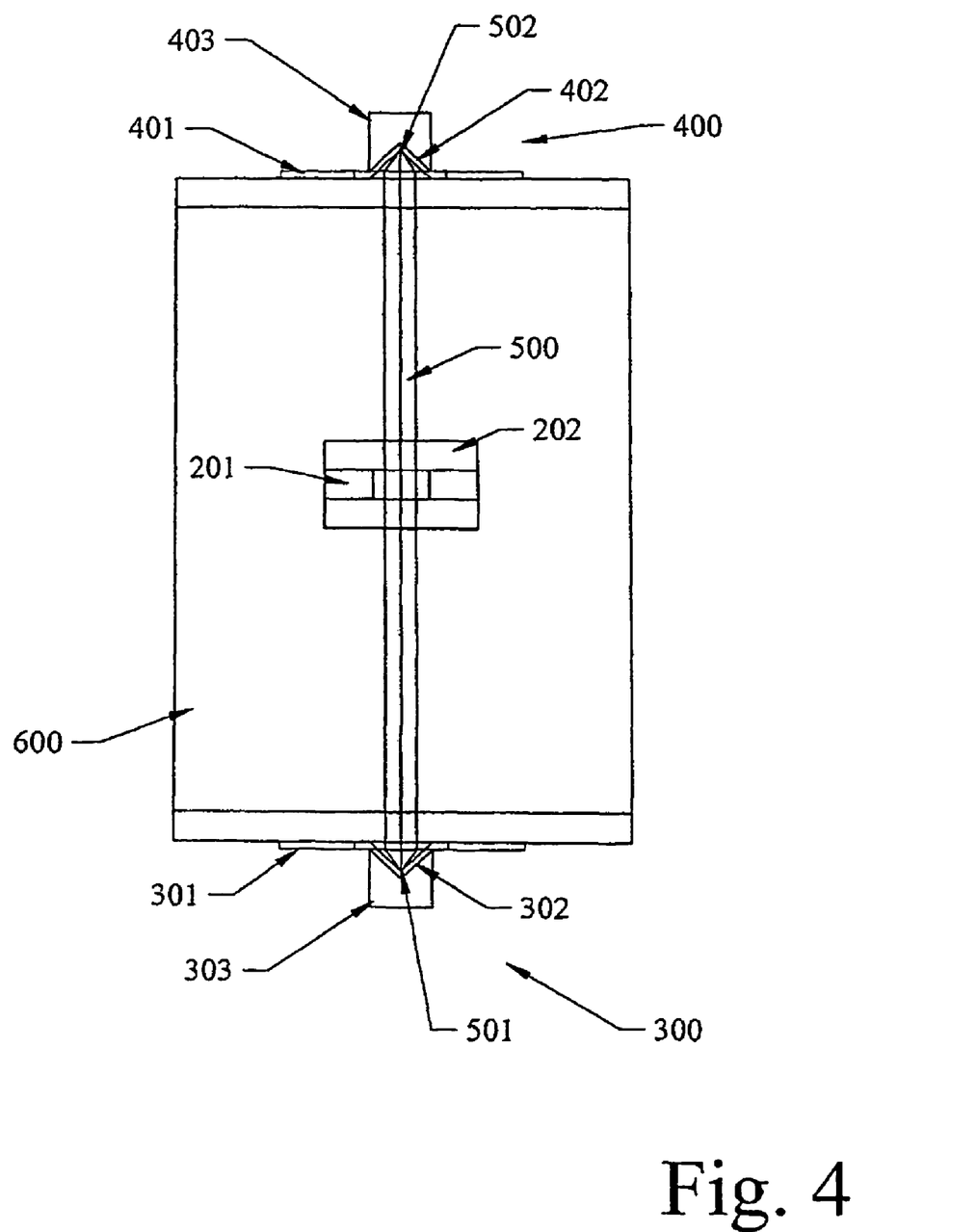
Figure 5:
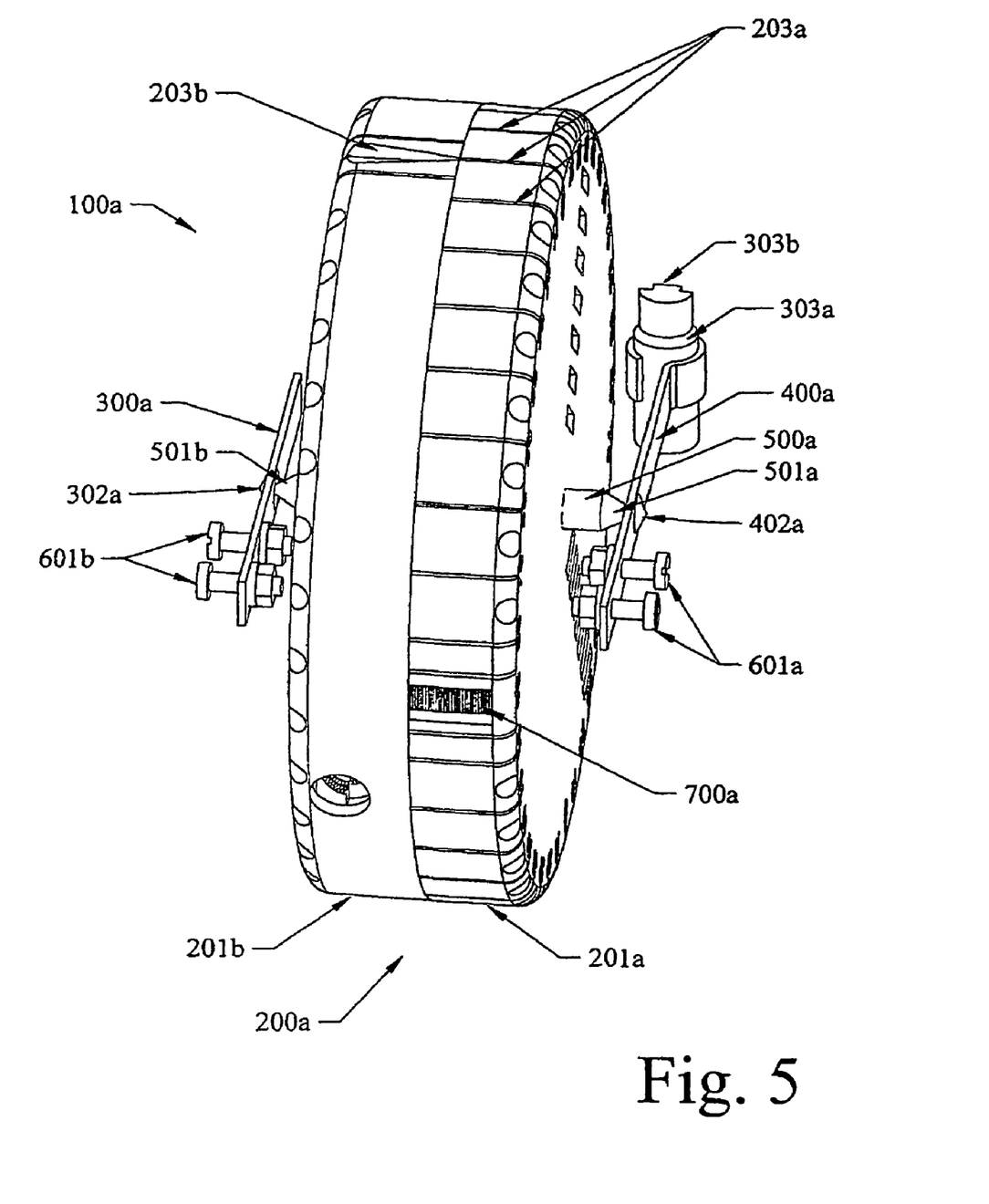
FIG. 5 is a perspective view of a second embodiment of a frictional pivot according to the present invention.
Figure 6:
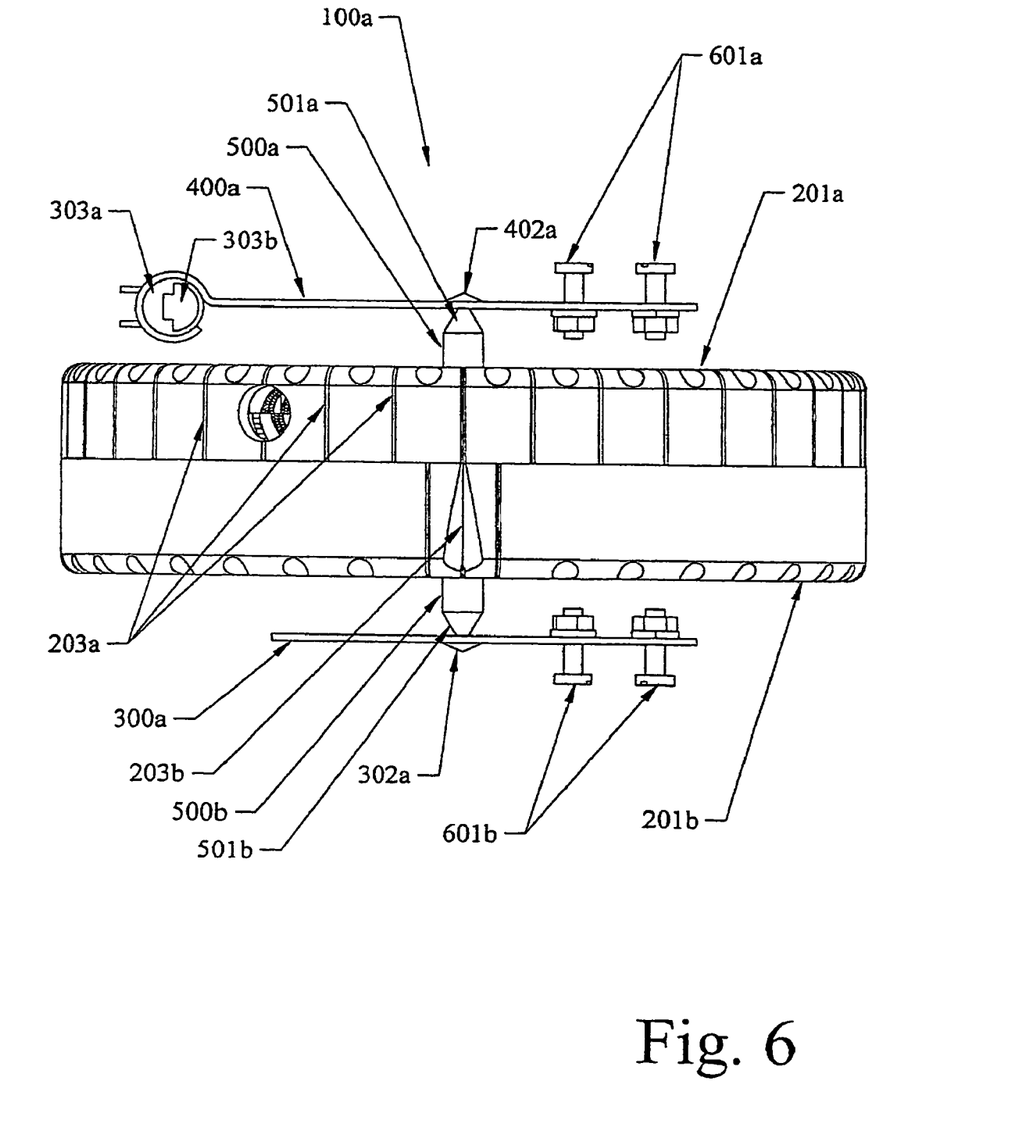
FIGS. 6 and 7 are plan and rear views of FIG. 5, respectively.
Figure 7:
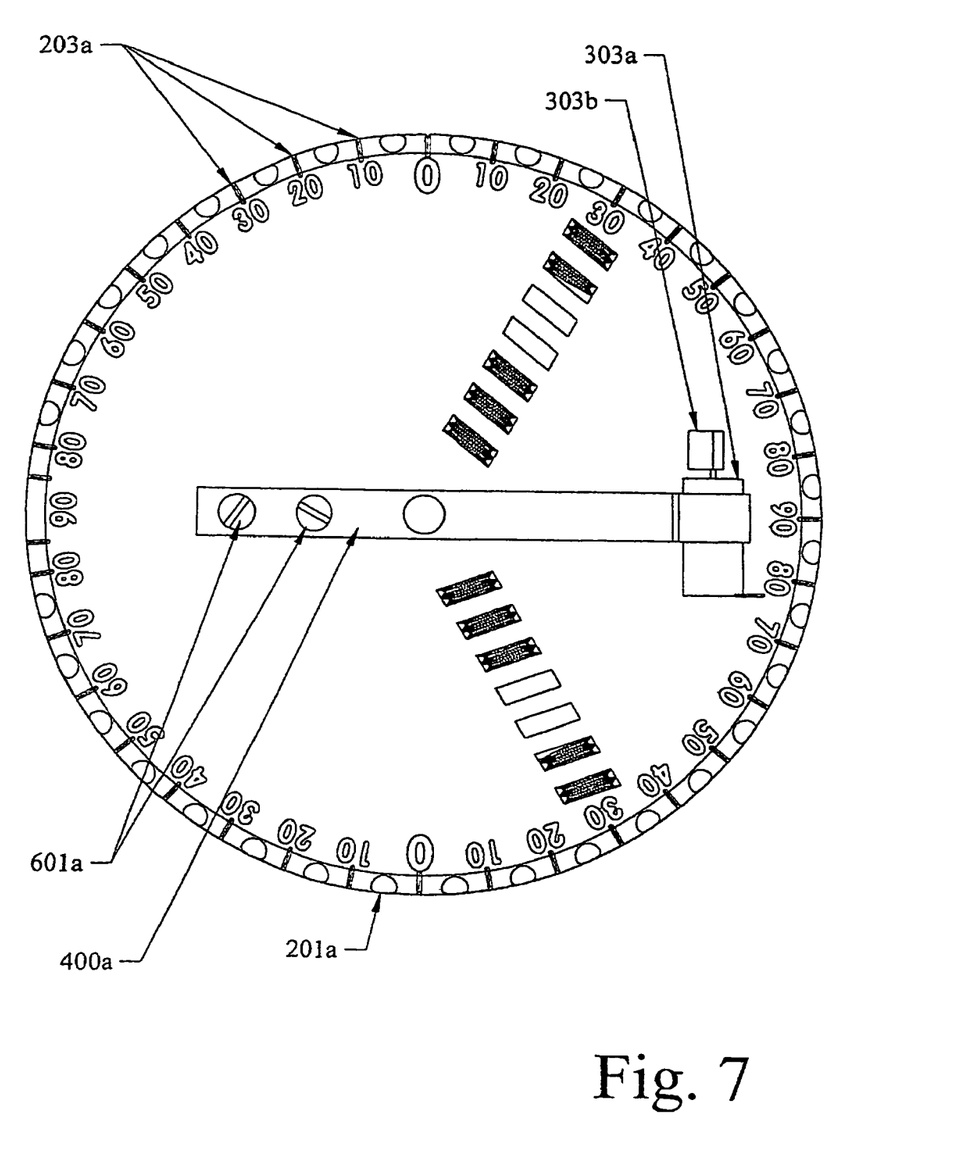

FIGS. 5 to 7 show an example of a laser light referencing tool incorporating a frictional pivot 100a comprising pendulous assembly 200a connected via axial shafts 500a and 500b to pivot halves 300a and 400a which are rigidly attached to a case.

Pendulous assembly 200a includes a first cylindrical housing 201a which contains laser projecting means emitting a beam towards laser aperture 700a. The first housing 201a also has angular reference marks 203a about its circumference. The first cylindrical housing 201a is frictionally attached about a common axis by shafts 500a and 500b to a second cylindrical housing 201b, which is eccentrically weighted and has a reference point 203b to indicate gravitational alignment.

Pivot half 300a is a thin strip of phosphor bronze with a conical depression 302a, rigidly attached to the case by fasteners 601b.

Pivot half 400a is also a thin strip of phosphor bronze. It has a conical depression 402a and is rigidly attached to the case by fasteners 601a. At the free end of pivot half 400a, a 1.5 volt motor 303a with axially attached eccentric weight 303b is secured. Electrical power is supplied to the laser light referencing tool and/or the vibration means 303, 403 through the pivot halves 300a and 400a.

The shafts 500a and 500b have conical ends 501a and 501b, respectively which locate in conical depressions 302a and 402a in pivot halves 301a and 401a.

Frictional pivots in accordance with the present invention are particularly suitable for use in laser light referencing tools of the kind disclosed in European patent publication EP-A-1012538 (WO 98/11407). When used in place of plain pivots, substantial gains in accuracy are achieved. When used in place of roller or ball bearings, great cost savings are realised without any sacrifice of accuracy and without the need for further damping means. The tool is also relatively immune to external environmental disturbances. Thus it will be seen that inexpensive, easy to use and accurate level, plumb and angular measurements are now possible.

The invention claimed is:

1. A frictional pivot comprising:

gravity-responsive directional means for indicating a datum direction of alignment with gravity, wherein the gravity-responsive directional means comprises a weighted pendulous arm orthogonally attached to a pivotable shaft;

frictional pivoting means for allowing the gravity-responsive means coarsely to align with gravity, wherein the frictional pivoting means are two opposing plates of a flexible material which are held apart at a predetermined distance by being rigidly attached to a case, and conical ends of the shaft are located in conical depressions in the two opposing plates;

vibration means for vibrating one or more elements of the pivoting means; and portable power means for powering the vibration means.

2. A frictional pivot according to claim 1, wherein the length and frequency of occurrence of vibration produced by the vibrating means are controlled by manual switches or electronic timing circuitry.

3. A frictional pivot according to claim 1, wherein the vibration means is a low-voltage electric motor with an axially attached eccentric weight.

4. A frictional pivot according to claim 1, wherein one or both of the two opposing plates are slugs of material with conical depressions and the slugs are axially movable relative to the pivotable shaft and held against the ends of the shaft by leaf or helical springs.

5. A laser referencing tool having a frictional pivot according to claim 1.

6. A laser referencing tool according to claim 5, further comprising an eccentrically weighted cylindrical housing frictionally attached about a common axis to another cylindrical housing, the second housing containing laser projecting means.

7. A laser referencing tool according to claim 6, wherein a reference point indicating gravitational alignment is a mark on the circumference of the weighted housing, with other marks spaced at regular angular intervals on the circumference of the second housing indicating the angular displacement of the laser projecting means away from the gravitational vertical.

8. A laser referencing tool according to claim 6, wherein the vibrating means is within one or both of the cylindrical housing.

* * * * *